United States Patent [19]

Strosser et al.

[11] Patent Number: 4,844,675

[45] Date of Patent: Jul. 4, 1989

[54] BALE ACCUMULATOR WITH AUTOMATIC CONTROL

[75] Inventors: Richard P. Strosser, Akron; Irwin D. McIlwain, Lancaster; Pierino Piccinato, Novi; Carl E. Bohman, New Holland, all of Pa.

[73] Assignee: Ford New Holland, Inc., New Holland, Pa.

[21] Appl. No.: 56,182

[22] Filed: Jun. 1, 1987

[51] Int. Cl.$^4$ ............................ A01D 87/12; A01D 90/10
[52] U.S. Cl. ............................ 414/111; 56/473.5; 280/656; 298/8 R; 414/493; 414/517; 414/917; 414/789.7
[58] Field of Search ............................ 280/656; 298/8 R; 414/44, 111, 491, 492, 493, 345, 501, 517, 917; 56/473.5

[56] References Cited

U.S. PATENT DOCUMENTS

| | | | |
|---|---|---|---|
| 4,101,158 | 7/1978 | Jones | 280/656 X |
| 4,119,224 | 10/1978 | Moody | 280/656 X |
| 4,215,964 | 8/1980 | Schrag et al. | 414/111 |

Primary Examiner—Robert J. Spar
Assistant Examiner—Janice Krizek
Attorney, Agent, or Firm—Griffin, Branigan & Butler

[57] ABSTRACT

A bale accumulator and optional caboose are controlled by a microprocessor-based control circuit associated with and controlling the baler which pulls the bale accumulator. The control circuit monitors bale switches actuated by the presence of bales on four tables, two switches indicating the position of a bale push bar, and three table switches indicating when individual ones of three of the tables are latched or released for dumping bales therefrom. An operator's panel provides a visual display of the status of the bale accumulator and includes switches which may be actuated by the operator. In response to the switches on the bale accumulator the control circuit controls the push bar to move bales from a center table onto a left or right table at the sides of the center table, or inhibits movement of the push bar so that a succeeding bale ejected from the baler pushes a bale on the center table onto a trailing fourth table. In response to actuation of a dump switch the control circuit determines which tables should be unlatched to dump a bale therefrom, and energizes a motor or motors to unlatch the tables as determined by the control circuit. All operations of the bale accumulator are automatic except for operator actuation of the dump switches.

13 Claims, 4 Drawing Sheets

BALE ACCUMULATOR WITH AUTOMATIC CONTROL

BACKGROUND OF THE INVENTION

Bale accumulators are well known agricultural machines used to accumulate a number of bales of crop material as the bales are pushed out of the bale casing of a rectangular baler. The bales may then be dumped in groups in a field for easier pickup, or may be transported to a remote location. As exemplified by U.S. Pat. No. 4,215,964, a typical bale accumulator of the prior art comprises a wheeled vehicle having a center, a right and a left table. The center table is fixed relative to the frame but the right and left tables may be unlatched so as to dump the bales thereon. A table is unlatched by an operator pulling a control rope. A caboose or fourth table may be attached to a bale accumulator such as the New Holland Inc Model 2010, the fourth table trailing the center table and being capable of dumping a bale located on the fourth table. A push bar is provided for moving bales ejected from the baler, and resting on the center table, onto the right or left table. By not actuating the push bar a succeeding bale ejected from the baler may push a bale on the center table onto the fourth table, if there is one.

With the prior art devices it is difficult to remember which tables have been dumped and which tables still hold bales. Furthermore, it is difficult for an operator to see all of the tables because the baler itself is large and blocks his view. To alleviate the problem it has been proposed that a system of mechanical flags be provided for signalling the operator which tables are occupied. However, such a system does not insure that the operator will choose to dump the bale or bales which should be dumped for most efficient use. For example, if all tables are full, the push arm is at the right of the center table, and the operator pulls the rope which causes the bale on the right table to be dumped, there is no way the right table can be loaded with another bale until after the left table has been dumped and then loaded with another bale.

SUMMARY OF THE INVENTION

An object of the present invention is to provide a bale accumulator with an automatic control circuit which controls all operations except for operator selection of the number of bales to be dumped.

An object of the invention is to provide a bale accumulator, a control circuit for sensing the status of the bale accumulator, and an operator's panel responsive to the control circuit for displaying for an operator the status of the bale accumulator.

In accordance with the principles of the present invention each table of a bale accumulator (including an optional fourth table) is provided with a bale sensor pad which actuates an electrical switch and each table capable of dumping a bale therefrom is provided with an electrical motor for unlatching the table and an electrical switch for sensing when the table is in the latched position. A push bar is provided which is movable between right and left positions to push a bale from a center table onto a right or left side table and two switches are provided for sensing when the push bar is at the right and left positions. A control circuit, which preferably includes a programmed microprocessor, monitors the switches and in response thereto produces output signals to control the movement of the push bar and displays on an operator's panel the status of the bale accumulator. The control circuit also periodically samples dump switches provided on the operator's panel and in response to selective actuation of the switches determines which bales should be dumped. The control circuit then energizes the required trip motors to dump the bales.

A feature of the invention is that if the side tables are provided with foldable extensions, the extensions, when folded, actuate the bale sensor pads on the tables. The control circuit prevents movement of the push bar toward a table whose bale sensor pad is actuated by either a bale or a folded extension. This prevents damage to the push bar such as might occur if the push bar should try to push a bale from the center table onto a side table which is either folded or already holds a bale.

A further feature of the invention is that the control circuit may comprise primarily a microprocessor-based control circuit which also monitors and controls the operation of the baler. The control circuit may compute bale slippage in the baler as taught in Strosser Patent No. 4,624,180. The computed bale slippage may be used to control the push arm so that it is not actuated when it would engage a bale which is only partially ejected from the bale chamber.

Other objects, features and advantages of the invention will become evident upon consideration of the following description and the accompanying drawings.

DETAILED DESCRIPTION OF THE INVENTION

Figure 1:
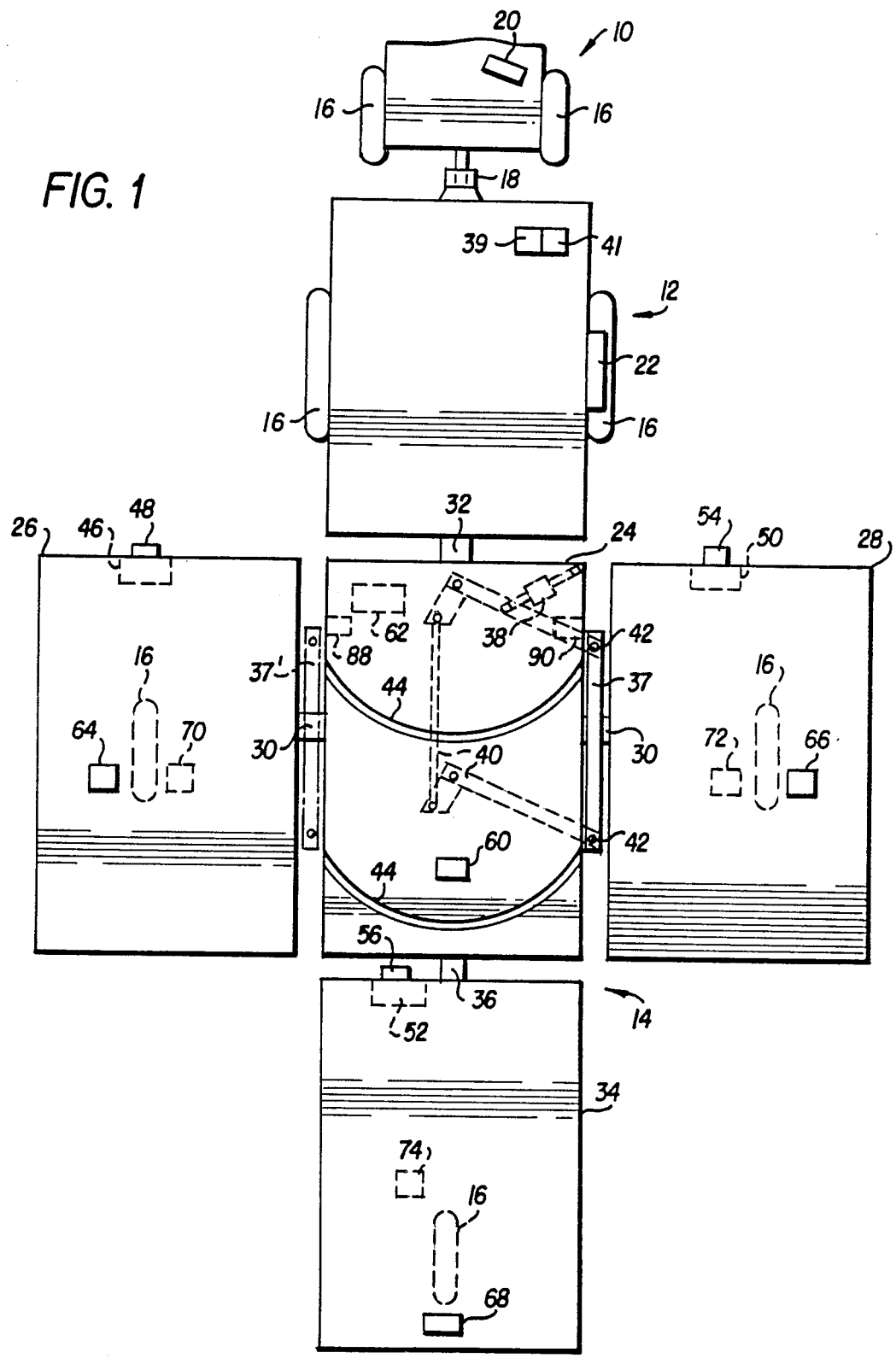
FIG. 1 illustrates a tractor, baler and bale accumulator connected in tandem, the bale accumulator having an optional fourth table.

FIG. 1 illustrates a tractor 10 pulling a rectangular baler 12 and a bale accumulator 14. The tractor provides the motive power for moving the train of machines along a windrow on wheels 16 and has a power take-off 18 for providing power to operate the hydraulic systems and mechanical elements of the baler 12 and bale accumulator 14. On the tractor 10, positioned so as to be accessible to the operator, is an operator's panel 20. The operator may operate switches on the panel 20 to control operation of the baler 12 and bale accumulator 14, and may observe indicators on the panel to determine the status of the system.

The baler 12 is a rectangular baler of a type well known in the art and is provided with a microprocessor-based control circuit 22 for controlling the baler. The control circuit is fully disclosed in Strosser Patent No. 4,624,180 the disclosure of which is incorporated herein by reference. As the baler is pulled along a windrow it picks up crop material, compresses it into rectangular bales, and pushes the bales out of the rear of the baler.

The bale accumulator 14 receives the bales as they are ejected from the baler. The bale accumulator comprises a center table 24, a left table 26 and a right table 28, all mounted on a frame generally indicated at 30 and pulled by a tongue 32 attached to the rear of baler 12. An optional fourth table 34 (caboose) may be provided in which case it is pivotally attached by a tongue 36 so as to trail behind the center table 24.

Bale accumulators are well known in the art and reference may be made to U.S. Patent 4,215,964 for a discussion of a typical baler accumulator structure and its operation. Generally speaking, as bales of crop material are ejected from the baler 12 they are pushed onto the center table 24. From the center table a bale may be pushed sidewise onto left table 26 or right table 28, or pushed endwise onto fourth table 34.

A bale on center table 24 may be pushed sidewise by a push bar 37 which is movable from the position shown to the position 37 shown in phantom outline. The mechanism for moving the push bar includes a cylinder 38 connected to a 4-bar linkage 40 located below table 24. The linkage is connected to vertical posts 42 which extend above the surface of the table, the push bar being attached at the upper portion of the posts so as to move above the surface of the table. Slots 44 are provided in the surface of table 24 to accommodate movement of posts 42. The cylinder 38 is actuated from solenoid controlled hydraulic values 39 and 41 connected in the hydraulic system of baler 12.

A bale on center table 24 may be pushed endwise onto fourth table 34 by another bale ejected from baler 12.

The center table 24 is fixed to frame 30 and remains in a generally horizontal plane parallel to the ground. However, the left, right and fourth tables 26, 28 and 34 are pivotally mounted on their frames so that when they are unlatched they tilt downwardly at the rear under the weight of a bale. When one of these tables is unlatched it tilts rearwardly and the bale slides to the ground as the bale accumulator continues its forward movement. When the weight of a bale is removed from a table it is returned to its latched position by a spring (not shown).

An electric trip motor 46 is energized to drive a cam to unlatch a latch 48 when a bale is to be dumped from the left table 26. In like manner trip motors 50 and 52 control latches 54 and 56 associated with right table 28 and fourth table 34, respectively.

The center table 24 has a sensor pad 60 which is actuated when a bale is on the table. The sensor pad actuates a switch 80 (FIG. 2) to send a signal to a bale accumulator controller 62 to indicate that the table is occupied by a bale. In like manner, tables 26, 28 and 34 are provided with sensor pads 64, 66 and 68 and associated bale switches 82, 84 and 86 connected to controller 62.

The left table 26 is provided with a switch 70 which senses when the table is in its home or latched position. In like manner, tables 28 and 34 are provided with switches 72 and 74, respectively. The switches 70, 72 and 74 are all connected to the controller 62.

In order to determine the location of the push bar 30, two switches 88 and 90 are provided. Switch 88 is actuated when the push bar is at the left side of center table 24 and switch 90 is actuated when the push bar is at the right side of table 24.

Figure 2:
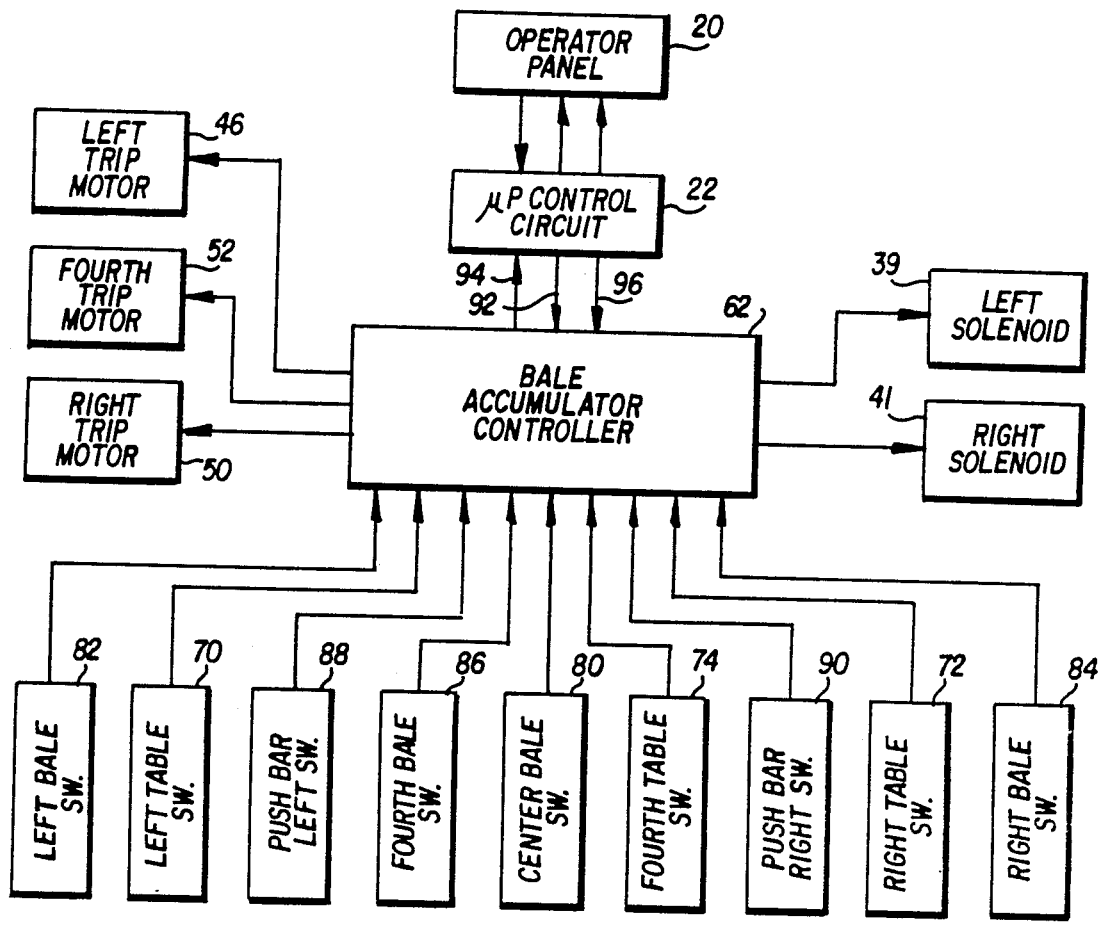
FIG. 2 is a block diagram of the electrical circuit including a microprocessor-based control circuit.

As shown in FIG. 2, the bale switches 80, 82, 84 and 86, the table switches 70, 72 and 74, and the push bar switches 88 and 90 are all connected as inputs to the bale accumulator controller 62. This controller may, for example, comprise type 74164 and 74165 parallel-to-serial and serial-to-parallel registers. The switches are connected to individual stages of a parallel input register which may be clocked to simultaneously sample the outputs of all the switches. The microprocessor based control circuit 22 periodically sends a clocking signal over a lead 92 to the register to serially read out the register over a lead 94 to the control circuit.

As disclosed in Strosser Patent No. 4,624,180, the microprocessor based control circuit 22 normally monitors various switches on operator panel 20 and various conditions of the baler 12 and develops output signals to control the baler and light various displays on the operator panel. In accordance with the present invention the control circuit 22 also monitors the state of the various switches on the bale accumulator 14 by periodically reading the parallel input register in the controller 62, and in response to the conditions of these switches and control switches on the operator's panel 20 outputs signals over lead 96 to controller 62. The controller converts the serial signals on lead 96 to parallel signals which are sent to the left and right solenoids 39 and 41 to control movement of the push bar 37, and to the trip motors 46, 50 and 52 to control the dumping of bales from the bale accumulator tables. The control circuit 22 automatically determines which table should receive a bale ejected from baler 12 onto center table 24. The only control required by the operator is the actuation of a switch indicative of the number of bales to be dumped. If less than three bales are to be dumped, the control circuit 22 determines the location of all bales and the push bar 37 and from this determines which bale or bales should be dumped.

Figure 5:
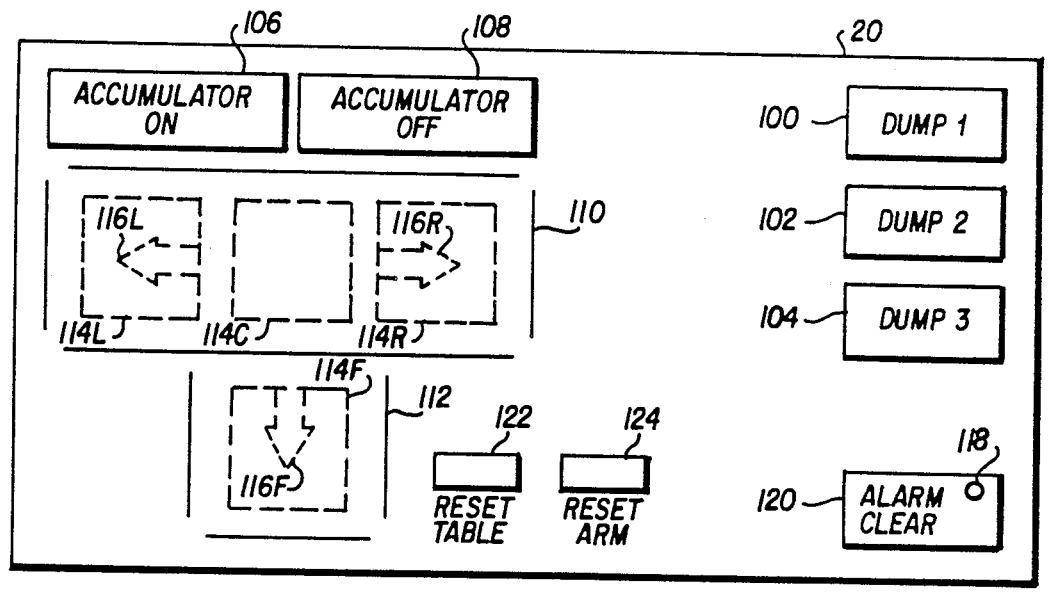
FIG. 5 illustrates an operator's panel with a visual display for displaying bale accumulator status and switches for selecting the number of bales to be dumped; and, FIG. 6 illustrates a portion of a LOOP routine.

The control circuit 22 continuously indicates the status of the bale accumulator on the operator's panel 20. The panel switches and displays pertinent to the bale accumulator are shown in FIG. 5 but a complete panel is illustrated in the Strosser patent referred to above. The panel includes Dump 1, Dump 2 and Dump 3 switches which the operator may actuate when he desires to dump 1, 2 or 3 bales from the bale accumulator, an Accumulator ON switch 106, and an Accumulator OFF switch 108. Depressing the switch 106 sets a flag which is recognized by the program executed by the microprocessor in control circuit 22 so as to control the bale accumulator outputs. Depressing switch 108 resets the flag so that the bale accumulator outputs are held in a known state and no control is exercised over the bale accumulator by the control circuit 22.

The display on panel 20 includes a rectangular border 110 which is lighted when the accumulator ON switch is actuated if the cable between the control circuit 22 and the bale accumulator controller 62 is connected. In addition a U-shaped border 112 is lighted if the cable between the basic bale accumulator and the optional fourth table 34 is connected.

The display also includes four smaller rectangular areas 114L, 114C, 114R and 114F corresponding to the left, center, right and fourth tables 26, 24, 28 and 34, respectively. When a table is occupied by a bale, the area within the rectangle corresponding to that bale is lighted.

Each of the areas 114L, 114R and 114F includes an arrow-shaped region for indicating the table to which the bale delivered to center table 24 is scheduled to be pushed. Normally the arrow is lighted to indicate the direction but if the rectangular area is lighted then the arrow is not lighted. For example, if the push arm 37 is on the right and a bale is on the center table 24, the rectangular area 114C would be lighted to indicate the presence of the bale on the center table and the arrow 116L would be lighted to indicate that the bale on the center table will be pushed onto the left table. On the other hand, if all four tables hold bales, the rectangular areas 114L, 114C and 114R are fully lit and the rectangular area 114F is lit except for the arrow 116F which indicates that the next bale will be delivered to the fourth table, pushing the bale presently on the table off the end of the table.

Table I indicates the various possibilities of loading three tables of a bale accumulator which does not have the optional fourth table.

TABLE I

| Bale Positions Occupied | | | Pusher Arm Position | Deliver |
|---|---|---|---|---|
| Left | Center | Right | Left/Right | Bale To |
| — | C | — | R | L |
| L | C | — | L | R |
| L | C | R | R | OFF |
| — | C | — | L | R |
| — | C | R | R | L |

From Table I it is seen that if the pusher arm 37 is at the right side of center table 24 then a bale on the center table is pushed onto the left table if that table is unoccupied. On the other hand, if the pusher arm 37 is at the left side of center table 24 then a bale on the center table is pushed onto the right table if that table is unoccupied. If all three tables are occupied then the pusher arm 37 is locked out and a fourth bale will push the bale on the center table off the rear of the table. The control circuit 22, in response to actuation of switches 100, 102 and 104, selects which tables are to be dumped so that a condition never exists where the pusher arm is on the right, the right table is empty and the left table has a bale, or the pusher arm is on the left, the left table is empty and the right table has a bale.

Table II is similar to Table 1 but shows the various possibilities for loading a bale accumulator having the optional fourth table 34.

TABLE II

| Bale Positions Occupied | | | | Pusher Arm Position | Deliver |
|---|---|---|---|---|---|
| Left | Center | Right | Fourth | Left/Right | Bale To |
| — | C | — | — | R | L |
| L | C | — | — | L | 4th |
| L | C | — | F | L | R |
| L | C | R | F | L | OFF |
| — | C | — | — | L | R |
| — | C | R | — | R | 4th |
| — | C | R | F | R | L |

As previously indicated, the operator may actuate one of the dump switches 100, 102 or 104 and in response thereto the control circuit 22 controls the dumping of one or more bales. Table III indicates the bale dumping sequence when the Dump 1, Dump 2 and Dump 3 switches are actuated and the baler accumulator does not have the optional fourth table.

TABLE III

| Operator Key Pad | Bale Positions Occupied | | | Push Arm Posit | Bales Dumped | |
|---|---|---|---|---|---|---|
| | Left | Cntr | Right | Left | Left | Right |
| "DUMP 1" SWITCH | L | X | — | X | 1st | — |
| | — | X | R | X | — | 1st |
| | L | X | R | L | — | 1st |
| | L | X | R | R | 1st | — |
| "DUMP 2" SWITCH | L | X | — | X | 1st | — |
| | — | X | R | X | — | 1st |
| | L | X | R | L | 2nd | 1st |
| | L | X | R | R | 1st | 2nd |
| "DUMP 3" SWITCH | L | X | — | X | 1st | — |
| | — | X | R | X | — | 1st |
| | L | — | R | L | 2nd | 1st |
| | L | — | R | R | 1st | 2nd |
| | L | C | R | L | 2nd | 1st 3rd |
| | L | C | R | R | 1st 3rd | 2nd |

L = LEFT BALE
R = RIGHT BALE
C = CENTER BALE
X = DON'T CARE SITUATION

It should be noted that if the Dump 2 or Dump 3 switch is actuated and there is only one of the right and left tables occupied, then only the trip motor for the occupied table is energized to unlatch and dump the bale thereon. An unoccupied table is never unlatched. Furthermore, when plural tables are to be dumped their trip motors are energized at one second intervals by ¾ second pulses.

As shown in Table III, it is possible to dump three bales from a baler accumulator which does not have the optional fourth table 34. If the left, right and center tables are all occupied and the Dump 3 switch is actuated, the controller first dumps the table opposite the side where the pusher arm 37 is, then dumps the table on the same side as the pusher arm. The control circuit then sends a signal to solenoid controlled valve 39 or 41 to move the pushed bar to its opposite side. This pushes the bale from the center table onto the table which was first dumped. The table is then actuated a second time to dump the bale that was originally on the center table.

If both the right and left tables are occupied and the Dump 1 switch is actuated, the control circuit selects for dumping the table which is on the opposite side from where the pusher arm 37 is presently located.

Table IV shows the dumping sequence for a bale accumulator having the optional fourth table 34. If the fourth table is occupied it is always dumped first except when all tables are occupied. When all tables are occupied the fourth table is the second one to be dumped, the first being the table on the side opposite where the pusher arm is.

TABLE IV

| Operator Key Pad | Bale Positions Occupied | | | | Swing Arm Posit. Left/Right | Bales Dumped | | |
|---|---|---|---|---|---|---|---|---|
| | Left | Cntr | Right | 4th | | Left | Right | 4th |
| "DUMP 1" SWITCH | L | X | — | — | X | 1st | — | — |
| | — | X | R | — | X | — | 1st | — |
| | L | X | R | — | L | — | 1st | — |
| | L | X | R | — | R | 1st | — | — |
| | X | X | X | F | X | — | — | 1st |
| "DUMP 2" SWITCH | L | X | — | — | X | 1st | — | — |
| | — | X | R | — | X | — | 1st | — |
| | L | X | R | — | L | 2nd | 1st | — |
| | L | X | R | — | R | 1st | 2nd | — |
| | L | X | — | F | X | 2nd | — | 1st |
| | — | X | R | F | X | — | 2nd | 1st |
| | L | X | R | F | L | — | 2nd | 1st |
| | L | X | R | F | R | 2nd | — | 1st |
| "DUMP 3" SWITCH | L | X | — | — | X | 1st | — | — |
| | — | X | R | — | X | — | 1st | — |
| | L | X | R | — | L | 2nd | 1st | — |
| | L | X | R | — | R | 1st | 2nd | — |
| | L | X | — | F | X | 2nd | — | 1st |
| | — | X | R | F | X | — | 2nd | 1st |
| | X | — | R | F | L | — | 2nd | 1st |
| | L | — | X | F | R | 2nd | — | 1st |
| | L | C | R | F | L | 3rd | 1st | 2nd |
| | L | C | R | F | R | 1st | 3rd | 2nd |

Figures 3A, 6:
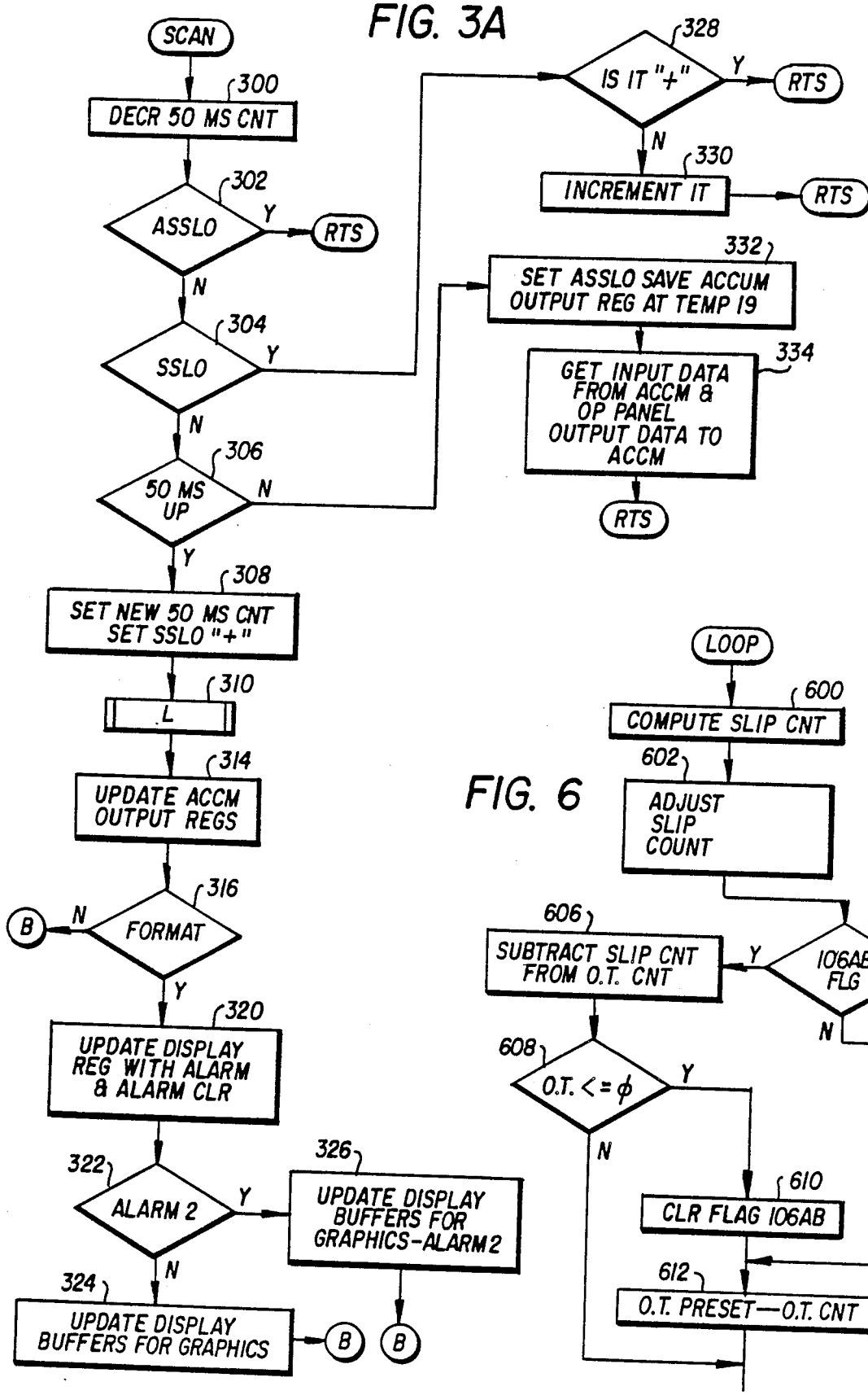
FIGS. 3A and 3B are flow diagrams illustrating the sequence of operations performed by the microprocessor in executing a SCAN routine to control the bale accumulator and an operator's display panel.
Figure 3B:
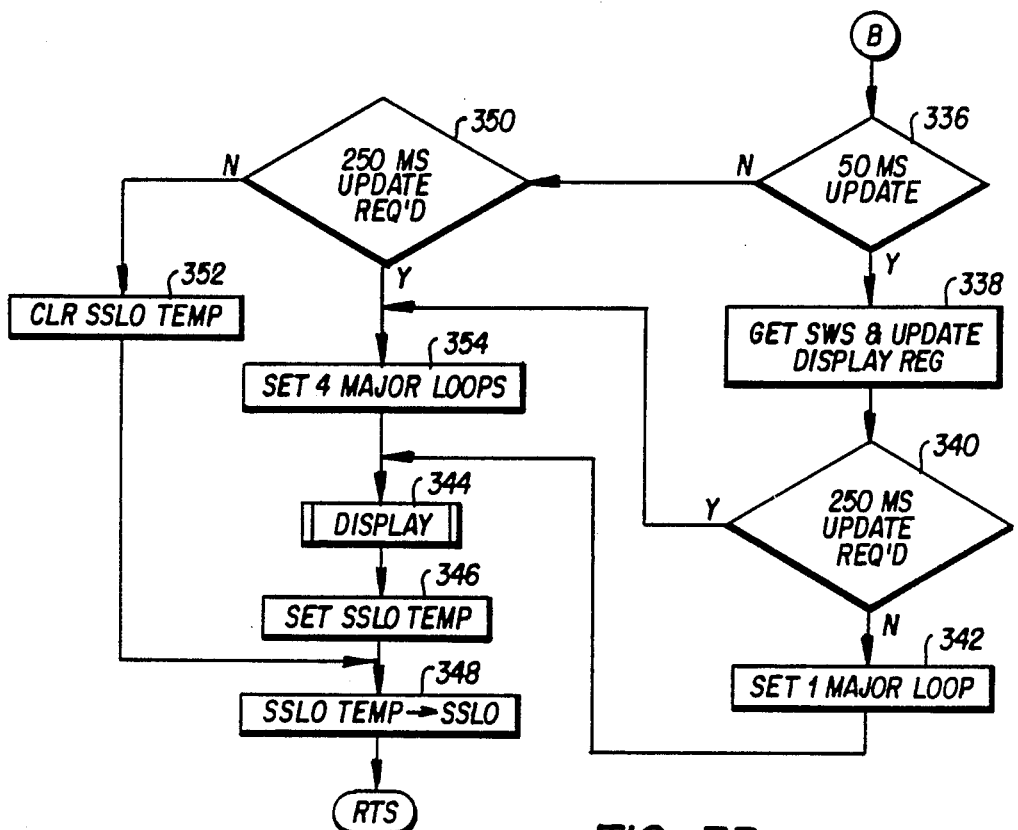

As explained in detail in the aforementioned Strosser patent, the microprocessor in control circuit 22 periodically executes a routine IRQT about every 500 microseconds. During execution of the IRQT routine a subroutine SCAN is called. Insofar as it relates to the present invention, the SCAN subroutine is illustrated in FIGS. 3A and 3B. It begins at step 300 (FIG. 3A) by decrementing a counter which tolls 50 millisecond intervals. At step 302 a flag ASSLO is tested to see if a scan of the various input switches on the bale accumulator and operator's panel is in progress. If it is, the program immediately returns to the IRQT routine.

If ASSLO indicates that a scan of the switches is not locked out, then SSLO is tested at step 304 to see if the scan is locked out. This flag is set or cleared at step 348 as subsequently described. If the scan is locked out then SSLO is tested at 328 to see if it contains a positive value. If not, a return is made to the IRQT routine. On the other hand, if SSLO does not contain a positive value it is incremented at step 330 before a return is made to IRQT.

If no scan lockout is indicated by SSLO at step 304, the counter decremented at step 300 is tested (step 306) to see if 50 ms have elapsed. If 50 ms have not elapsed, ASSLO is set at step 332 and the previous input data from the bale accumulator switches is saved at a memory location TEMP 19. Next, the bale accumulator controller 62 is accessed (step 334) to transfer to the control circuit 22 the status of the baler switches. The operator panel 20 is also accessed to obtain the status of the various panel switches including dump switches 100, 102 and 104. Next, the baler accumulator controller 62 is accessed and the data for controlling the swing arm 37 and trip motors 48, 50 and 52 is transferred to the controller. The program then returns to the IRQT routine.

If the test at step 306 shows that 50 ms have expired the program resets the counter (step 308) to toll another 50 ms interval and sets a positive value in SSLO.

At step 310 a sequence of macro instructions is executed to determine, from the switch and input data obtained the last time step 334 was executed, and from various sensed conditions of baler 12, what should be displayed on the operator's panel 20 and what output data should be sent to the bale accumulator controller 62 the next time step 334 is executed. These macro instructions set various flags which are subsequently assembled into bytes of data for serial-by-bit transfer to the panel 20 and controller 62.

At step 314 the various flags developed at step 310 for controlling the bale accumulator are assembled into bytes and saved at locations reserved for data to be fed out to the bale accumulator controller.

At step 316 a flag FORMAT is tested and if it is not set the program branches to FIG. 3B. The format flag is set every ¼ second in another routine. If the test at step 316 shows that it is set the program branches to step 320.

At step 320 the code for lighting LEDs is retrieved from memory and the bit positions controlling the Alarm Clear LED 118 and audible alarm are updated, the updated information being saved in a display buffer. Next, the Alarm 2 flag is tested at step 322. If it was set during step 310 the program moves to step 326 to update the display buffer for the graphic portion of the display including the borders 110 and 112, blocks 114 and arrows 116, as required. If the Alarm 2 flag was not set at step 310 then the display buffers are updated at step 324 for displaying the graphics portion of the panel display.

From step 324 or step 326 the program moves to step 336 (FIG. 3B) where the 50 ms flag is tested to see if a 50 ms update is required. If it is, the LED code is retrieved (step 338) and the bits for the alarm and the Alarm Clear LED are updated and saved in a display buffer. The 250ms flag is tested at step 340 to find out if a 250ms update is required. If it is not, a value 1 is set at step 342 and passed to a display routine (step 344) the data in the display buffer is displayed at panel 20. If the test at step 340 shows a 250ms update is required then a value 4 is set at step 354 before calling the display routine at step 344. The values set at steps 342 and 344 are used in the display routine to control the number of times a loop is executed.

After the panel display is updated at step 344 a flag is set in location SSLO Temp and at step 348 it is transferred to SSLO. This means that the switch scan is locked out at step 304 the next time the scan routine is called. After step 348 the program returns to the IRQT routine.

At step 336, if a 50 ms update is not required, the program branches to step 350 and tests to see if a 250ms update is required. If a 250ms update is required the program moves to step 354 and proceeds as previously described. On the other hand, if a 250ms update is not required location SSLO Temp is cleared at step 352 and transferred to SSLO 348 before a return is made to IRQT. This clears SSLO so that the scan routine is not locked out at step 304.

Appended hereto is a listing of the macro instructions executed during the subroutine L at step 310, insofar as they relate to the control of the bale accumulator, and the display of its status. The listing is for a bale accumulator which may have the optional fourth table 34. Generally speaking, the subroutine develops flags which are subsequently sent to the controller 62 to control the bale accumulator and to panel 20 to control the display. Assuming no faults or errors, the flags developed control the baler accumulator so that it operates in accordance with Table I or Table II (depending on whether the forth table is attached) to control push bar 37 to deliver the bales from the center table 24 to the other tables, and control the table trip motors in accordance with Table III or Table IV to dump bales from the tables.

Several features of the macro listing should be noted. If the push bar 37 leaves either the left or right home position and does not reach the other position in five seconds, the push bar control returns the push bar to its starting position and the "reset push bar" indicator 124 is turned on in the display and an Alarm 2 indication (with audible alarm) is given as a signal to the operator that he should check for the cause of the failure. In the listing, at line 33, the push bar left switch flag 1N as obtained at program step 334 produces the flag 102M. At line 163, 102M controls the setting of a latch 106Y. At line 196, 106Y controls a 5 second delay 107R. At line 232, 107R controls the generation of flag 110A which, in effect, triggers a single shot at line 245 to generate flag 111A. At line 201, 111A generates 107V and at line 205 this flag controls flag 108A and, at line 207, flag 108B.

At line 220, 108A generates flag 109A which is equated to 199E (at line 323). This flag represents an output to move the push bar 37 to the left. Because of the 5 second delay at line 196, the flag 199E remains on until the push bar right switch 90 is actuated or a maximum of 5 seconds after the left push bar switch opens. At line 221, 10B generates flag 109B which is equated to 199D (at line 322). This flag represents an output to move the push bar 37 to the right. A similar circuit sequence may be traced to produce the flag 199D for moving the push bar to the right.

The Alarm 2 condition is displayed on panel 20 with the "reset arm" indicator 124 being turned on. The macro sequence sets the flag 199R. The flag 110A, generated as described above, controls the generation of flag 112A (line 262) and 112A is equated to the flag 199R.

The macro sequence also generates a flag 199Q to light the "reset table" indicator 122 if a table does not return to its home position within eight seconds after being unlatched. The flag also causes the audible alarm to sound and a display in the Alarm mode. For the right table the macro may be traced from the right table home switch 1F to 102Q which introduces the eight-second delay, 102T, 103J, 105F and 105J which equates to flag 199Q.

No signals can be sent to solenoid valves 39 and 41 to control cylinder 38 and move the push bar 37 if a bale emerging from the baler 12 has pushed a bale on the center table 24 rearwardly so far that it cannot be reliably pushed to one side by the push bar 37. This is accomplished as follows. Strosser Patent No. 4,624,180 discloses a method whereby the control circuit 22 computes a "slip count" which is an indication of the distance a bale moves rearwardly in the bale casing of baler 12. Since each bale ejected by the baler is pushed onto center table 24 by the succeeding bale, the slip count can also be used as an indication of the location of a bale on the center table. During execution of the IRQT routine the program jumps to a subroutine LOOP (portion shown in FIG. 6) where it computes (at step 600) the slip count for the last stroke of the plunger in the baler 12. The slip count is normalized (step 602).

A full house flag 106AB is then tested at step 604. This flag is set at step 310 of the scan routine if the center table and fourth table bale switches are actuated and the setting of the flag will normally permit the left or right solenoid valves to be energized to move the push bar 37. If the test shows that flag 106AB is not set, the LOOP routine branches to step 612 where the over travel distance derived at step 602 is saved at a location designated O.T. CNT.

If the test at 604 shows the flag is set, the slip count is subtracted from the O.T. CNT. (step 606) and the difference is saved at location O.T. CNT. Step 608 determines if O.T. CNT. is less than or equal to $\phi$. If it is, flag 106AB is cleared at step 610 before proceeding to step 612. At step 612 the O.T. CNT. is preset to a value corresponding to ⅓ of the total bale length.

If the test at step 608 shows that O.T. CNT. is greater than $\phi$ then the program branches to the next instruction following step 612. This leaves in O.T. CNT a count representing the remainder of bale travel permissible after which the push arm 37 is prevented from being actuated.

Figure 4A:
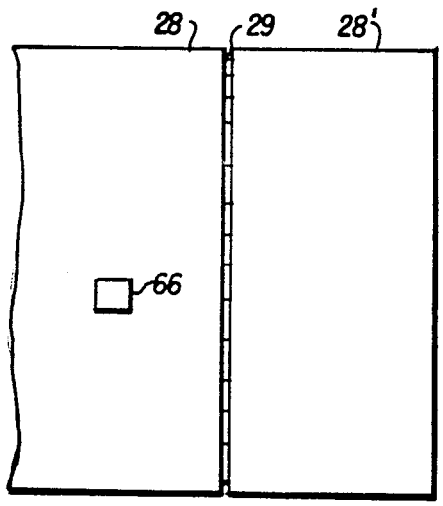
FIG. 4A illustrates a side table with an extension open ready for use.
Figure 4B:
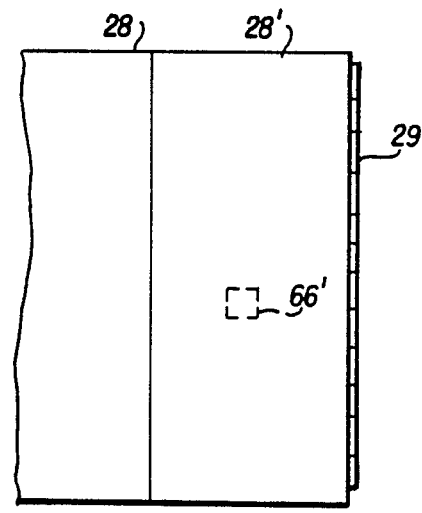
FIG. 4B illustrates a side table with the extension folded so as to actuate the bale sensor pad provided on the table.

FIG. 4A shows a portion of a right table 28 for a bale accumulator such as the New Holland Inc. Model 2010. It is provided with an extension 28' hinged to table 28 by a hinge 29. The extension may be unfolded as shown in FIG. 4A to be generally coplanar with table 28 or it may be folded upwardly about hinge 29 so as to lay on top of the surface of table 28 as shown in FIG. 4B. A similar extension may be provided for the left table 26 (FIG. 1). The extension may be folded to reduce the width of the bale accumulator when it is being moved along a roadway or when it is to be garaged.

A feature of the present invention is that the bale sensor pads for the tables are positioned such that when the extensions are folded they actuate the sensor pads. Thus, in FIG. 4B the extension 28' is depressing sensor pad 66'. Therefore, when a table extension is folded the sensor pad actuates a switch to give a false indication that a bale is on the table. As previously explained, when the control circuit 62 senses the presence of a bale on a table it prevents generation of a control signal to move the push bar toward that table. This arrangement prevents damage to the push bar mechanism such as would result if the push bar were actuated to move a bale onto a table whose extension is folded.

While a preferred embodiment of the invention has been described in specific detail it will be obvious that various substitutions and modifications can be made in the described embodiment without departing from the spirit and scope of the invention as defined by the appended claims.

The embodiments of the invention in which an exclusive property or privilege is claimed are defined as follows.

We claim:

1. In a bale accumulator having at least a center table for receiving bales of crop material pushed from the rear of a baler, right and left tables, and push bar mans including a push bar for pushing a bale on the center table to the right or left table, the improvement comprising:
   bale switch means associated with each of said tables for sensing a bale thereon;
   push bar switch means for sensing when said push bar is at a first position on the right side of said center table or a second position on the left side of said center table;
   control circuit means responsive to said push bar switch means and said bale switch means for selectively actuating said push bar means to selectively control movement of said push bar between said first and second positions;
   dump means associated with said right table and said left table; and
   a plurality of manually actuated electrical switches for selecting the number of bales to be dumped and initiating a dumping sequence;
   said control circuit means being responsive to said manually actuated switches, said bale switch means and said push bar switch means for determining which tables should be dumped and controlling said dumping sequence so that all tables not dumped may have a bale pushed thereon prior to an initiation of a further dumping sequence, said control circuit means applying signals to actuate the dump means associated with the tables which should be dumped.

2. The improvement as claimed in claim 1 and further comprising a fourth table attached to said center table for receiving a bale pushed from said center table by a succeeding bale pushed from said baler when said control circuit means fails to actuate said push par means, said fourth table having dump means associated therewith and a bale switch means for sensing a bale thereon; said control circuit means being responsive to all said bale switch means for selectively applying signals to all said dump means.

3. The improvement as claimed in claim 1 wherein each table except said center table is pivotally supported and has spring means associated therewith for returning the table to a home position, the weight of a bale on a table causing it to pivot from said home position to dump a bale thereon when the associated dump means is actuated, each said dump means comprising a latch for latching the associated table in the home position, a cam, and an electric motor for driving said cam to unlatch said latch.

4. The improvement as claimed in claim 1 wherein said control circuit means comprises a microprocessor.

5. The improvement as claimed in claim 1 and further comprising display means responsive to said control circuit means for visually displaying an indication of which of said tables has a bale thereon.

6. The improvement as claimed in claim 1 wherein there are three manually actuated electrical switches for selectively initiating a dumping sequence for dumping one, two or three bales.

7. The improvement as claimed in claim 1 wherein said control circuit means controls said push bar means during a dump sequence to push a bale from said center table to one of said right and left tables for dumping.

8. The improvement as claimed in claim 2 wherein each table except said center table is pivotally supported and has spring means associated therewith for returning the table to a home position, the weight of a bale on a table causing it to pivot from said home position to dump a bale thereon when the associated dump means is actuated, each said dump means comprising a latch for latching the associated table in the home position, a cam, and an electric motor for driving said cam to unlatch said latch.

9. The improvement as claimed in claim 2 and further comprising display means responsive to said control circuit means for visually displaying an indication of which of said tables has a bale thereon.

10. The improvement as claimed in claim 1 wherein there are three manually actuated electrical switches for selectively initiating a dumping sequence for dumping one, two or three bales.

11. In a bale accumulator having at least a center table for receiving bales of crop material pushed from the rear of a baler, right and left tables, and push bar mans including a push bar for pushing a bale on the center table to the right or left table, the improvement comprising:
   bale switch means associated with each of said tables for sensing a bale thereon;
   push bar switch means for sensing when said push bar is at a first position on the right side of said center table or a second position on the left side of said center table; and
   control circuit means responsive to said push bar switch means and said bale switch means for selectively actuating said push bar means to selectively control movement of said push bar between said first and second positions; said right and left tables being provided with associated extensions, hinge means connecting each extension to its associated table so that an extension may be folded to rest on top of its table, the bale switch means for the right and left tables being positioned such that a bale switch associated with a given table is actuated if the extension for the table is folded.

12. In a bale accumulator having at least a center table for receiving bales of crop material pushed from the rear of a baler, right and left tables, and push bar mans including a push bar for pushing a bale on the center table to the right or left table, the improvement comprising:
   bale switch means associated with each of said tables for sensing a bale thereon;
   push bar switch means for sensing when said push bar is at a first position on the right side of said center table or a second position on the left side of said center table;
   control circuit means responsive to said push bar switch means and said bale switch means for selectively actuating said push bar means to selectively control movement of said push bar between said first and second positions;

dump means associated with each table except the center table; and a plurality of manually actuated electrical switches for selecting the number of bales to be dumped and initiating a dumping sequence;

said control circuit means being responsive to said manually switches, said bale switch means and said push bar switch means for determining which tables should be dumped and the sequence in which they should be dumped, said control circuit means applying signals to actuate the dump means associated with the tables which should be dumped in the sequence in which they should be dumped.

13. The improvement as claimed in claim 12 wherein said control circuit means controls said push bar means and said dumping means so that two bales may be dumped from one of said right and left tables during a single dump sequence if one of the bales to be dumped is on said center table.

* * * * *